United States Patent [19]
Boero et al.

[11] Patent Number: 5,129,027
[45] Date of Patent: Jul. 7, 1992

[54] DRAWING HEAD FOR RIBBON TYPE OPTICAL CABLES EQUIPPED WITH RESPECTIVE END CONNECTORS

[75] Inventors: Paolo Boero, Milan; Bruno Bortolin, Cinisello Balsamo, both of Italy

[73] Assignee: Pirelli Cavi S.p.A., Milan, Italy

[21] Appl. No.: 661,700

[22] Filed: Feb. 27, 1991

[30] Foreign Application Priority Data

Feb. 28, 1990 [IT] Italy .................. 19510 A/90

[51] Int. Cl.⁵ .......................... G02B 6/00; G02B 6/36
[52] U.S. Cl. ............................... 385/104; 174/79; 254/134.3 FT; 385/136; 403/286; 403/299
[58] Field of Search ............. 254/134.3 R, 134.3 FT; 174/74 R, 74 A, 79; 294/1.1, 82.1; 403/286, 287, 299, 345; 385/100, 104, 136, 137

[56] References Cited

U.S. PATENT DOCUMENTS

| 4,337,923 | 7/1982 | Smith ...................... 254/134.3 FT |
| 4,691,988 | 9/1987 | Tremblay et al. ................ 385/136 |
| 4,847,447 | 7/1989 | Eiswirth et al. .................... 174/79 |
| 5,039,196 | 8/1991 | Nilsson ............................ 385/136 |

Primary Examiner—Jay H. Woo
Assistant Examiner—James P. Mackey
Attorney, Agent, or Firm—Brooks Haidt Haffner & Delahunty

[57] ABSTRACT

A drawing head for ribbon type optical cables having optical fibres in ribbons with respective end connectors, a central strength member and a grooved core includes a drawing member connected at one end thereof to the axial strength member of the cable and at the other end thereof to a pulling and grasping member, which drawing member is surrounded by a flexible body. The drawing member has a length corresponding to a predetermined fibre ribbon length required for establishing cable connections, and the flexible body is provided with grooves adapted to accommodate the fibre ribbons disposed in alignment with the grooves of the cable core. The flexible body is followed by a deformable supporting body surrounding the drawing member and which can be deformed by the connector to provide longitudinally separated and aligned recesses for receiving the end connectors of the ribbons of each ribbon group accommodated in a given groove. Tubular articulated segments and axial preloading devices are also present, the former providing an external protection and the latter compensating for the elongation of the drawing member when subjected to pulling forces.

26 Claims, 3 Drawing Sheets

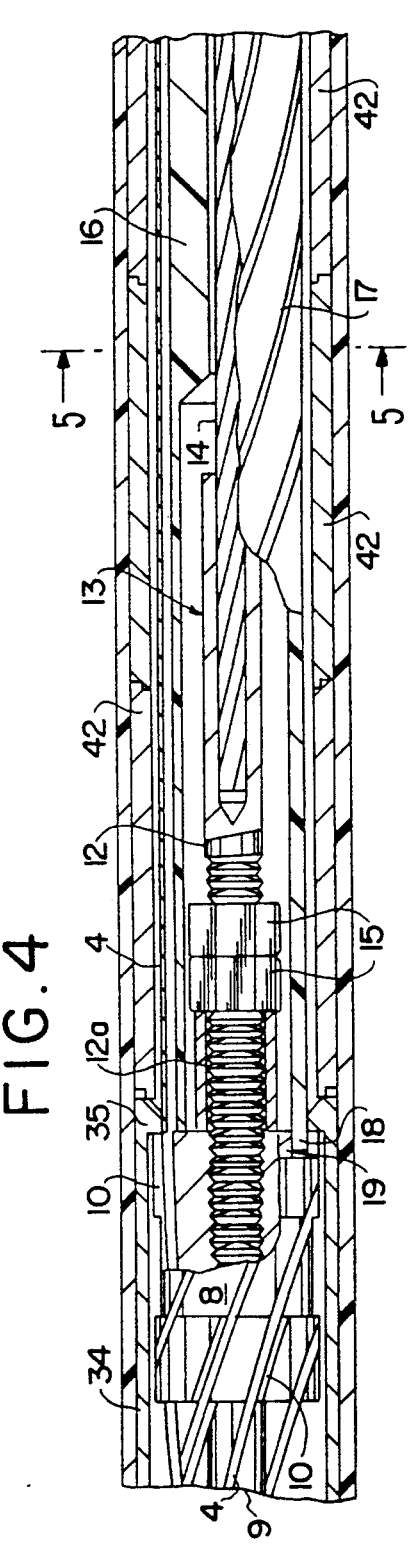
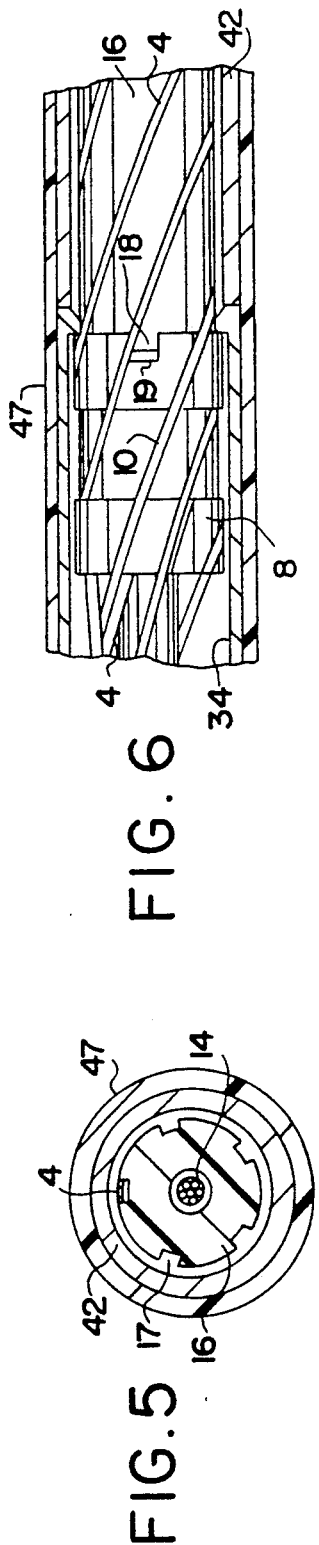
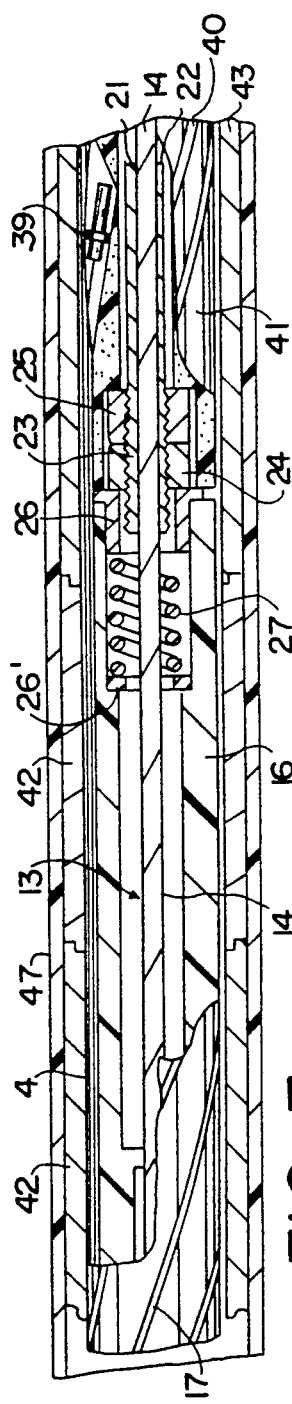

DRAWING HEAD FOR RIBBON TYPE OPTICAL CABLES EQUIPPED WITH RESPECTIVE END CONNECTORS

BACKGROUND OF THE INVENTION

The present invention relates to a drawing head for ribbon optical cables, having optical fibre ribbons previously provided with end connectors.

In optical telecommunication cables there are very often used optical fibres which are gathered into groups of parallel fibres having a common plastic coating so as to form optical fibre ribbons.

Several optical fibre ribbons are then superposed and housed in respective longitudinal grooves of a carrying element referred to as "slotted spacer or core". The longitudinal grooves have a helical development, the helix being open or closed.

Axially along the length of the cable there is provided a strength member consisting, for example, of a cord made of metal, fibre glass or the like, whereas at the outside of the slotted core there are several coating layers having specific protective functions.

Optical cables of the above type are usually referred to as "ribbon cables".

Ribbon cables can be supplied by the manufacturer cut at the end and designed to be directly connected, at the time of installation, to respective destination equipment or to another cable, or connectors can be applied thereto in situ, which connectors in turn are adapted to enable the connection to the equipment or other cable. Alternatively, the ribbon cables can be previously equipped with connectors directly mounted by the cable manufacturer or the user in a place different from that designed for the cable installation.

Cables previously provided with connectors are preferred for many reasons, in particular because the connector-applying operations can be carried out under controlled conditions and in appropriate places which ensures the best results, and also because the cable laying operations are less expensive since the cable, if previously equipped with the connectors, is immediately ready for the intended connections.

However, while cables having bare ended fibre ribbons enable the end portion thereof to be removed if, on the laying, it looks damaged, ribbon cables already provided with connectors must be used as such and therefore damage to the connectors during the laying operations is not permissible.

It is known that cable laying involves the introduction of the cables into underground passages or ducts where, starting from one end, the cable is pulled over the whole length thereof.

This causes the cable and tape connectors to be unavoidably submitted to stresses of various kinds so that protection is particularly needed for the tapes.

In order to carry out the cable laying operations equipment referred to as "drawing heads" are known which are fastened to the pulling-resistant parts of the cable and provide grasping means, for example, in the form of eyebolts or the like, through which the cable can be seized and drawn into its housing.

In the case of cables provided with end connectors the drawing head must also provide an enclosure for the connectors capable of ensuring protection for the connectors as well.

In addition a drawing head must also accommodate an excess portion of fibre enabling the fibres to be connected at the intended positions after the cable support parts have been mechanically fastened to a rigid member which is a part of the destination equipment.

To this end, in known drawing heads, the excess portions of fibre ribbons are arranged to be kept in the form of skeins which are then unwound on the connection, respective rigid supports also being provided in the heads for receiving the connectors.

However, while these solutions can be usually accepted for high-capacity cables containing more than 400 fibres, for example, which are accommodated in large sized raceways, they are not convenient for low-capacity cables containing 100 fibres, for exampe, for which raceways of reduced diameter are provided.

In fact, when the excess portion of the optical fibre ribbons forming the ribbon cable are to be wound in the form of skeins, they are submitted to bending. It has been found that when small bending diameters, less than 30 mm, for instance, are kept for some time, for example when a cable equipped with the respective drawing head stays in stock for a given period, there is an unacceptable reduction in the transmission capabilities of the fibres.

Therefore, whereas cables of large diameter can accept drawing heads having a correspondingly large diameter, adapted to acccommodate excess portions of fibre ribbons in the form of skeins involving bending to a radius that does not induce significant attenuation in the fibre, drawing heads of the above diameters could not be accepted for cables of small diameter to be inserted in raceways, housings or the like with reduced clearance.

The availability of a drawing head for ribbon type optical cables having a reduced diameter but without causing too small bending radii for the fibres is, therefore, needed in order to provide a head adapted for all sizes of ribbon type optical cables.

SUMMARY OF THE INVENTION

The present invention has an object to provide a drawing head having a reduced diameter and offering a sturdy housing to connectors previously mounted on the respective ribbons, while protecting the fibre ribbons and the connectors themselves against stresses and possible water infiltration.

In is another object of the present invention to provide a drawing head for ribbon type optical cables in which optical ribbon fibres are gathered into groups of ribbons accommodated in respective helical grooves provided in a slotted cable core surrounding an axial strength member and in turn surrounded by further outer protective and/or pulling-resistant coatings, the optical fibre ribbons being equipped with respective end connectors, wherein the drawing head includes a drawing member connected at one end thereof to the axial strength member and to the pulled-resistant elements of the cable and at the other end thereof to a pulling grasping member, which drawing member has a flexible slotted body surrounding it with a length corresponding to a predetermined excess value of the fibre ribbon length and is provided with grooves adapted to accommodate the fibre ribbons disposed in alignment with the grooves of the slotted cable core. The slotted body is followed by a deformable support body also surrounding the drawing member and provided with longitudinally separated and aligned cavities located at positins which are not determined prior to receiving the connectors and which are designed to receive the end connectors of the ribbons of each ribbon group accommodated in one groove of the cable core. Tubular articulated segments and axial preloading means are provided, the former offering external protection and the latter compensating for elongation of the drawing member when subjected to pulling stresses.

In particular, the drawing member comprises a connecting body to be rigidly fastened to the cable stength member to which a tie rod is connected, in coaxial relation with the strength member, which body has grooves on the outer surface thereof corresponding in number, section and direction to the grooves of the cable core housing the fibre ribbons, said ribbons being led from the grooves in the cable core to the grooves in the connecting body without substantial bending changes.

Conveniently, the slotted body surrounding the drawing member has fastening means in alignment with the connecting body, adapted to prevent the slotted body from rotating relative to the connecting body and to keep the slotted body grooves in proper relationship with the grooves of the connecting body itself.

In the drawing head of the invention elastic tightening means is provided for locking the slotted body against the connecting body, adatped to compensate for extension of the tie rod when submitted to pulling strensses.

The mechanical engaging means for fastening the drawing member to the other pulling-resistant cable coating or coatings compreses a tubular body axially abutting against the connecting body and joined with a sleeve rigidly fastened to the outer pulling-resistant cable coating or coatings.

The tubular body is joined to the sleeve fixed to the pulling-resistant cable coatings by means of a tightened threaded coupling, relative unscrewing-resitant means being provided, preferably interposed between the tubular body and the connecting body.

The connecting body, after removing the tie rod, provides means adapted to provide mechanical engagement of the cable with external equipment.

Tubular mechanical-protection segments or tube portions are provided surrounding the slotted body which segments are articulated with respect to each other, preferably through ball-and-socket joints provided with abutment surfaces restraining the articulation angle.

The flexible slotted body has helical grooves of greater pitch than the grooves of the cable core.

In the above preferred embodiment, with the diameter of the flexible slotted body ranging between 2 and 5 times the diameter of the slotted core in the cable, the pitch of the grooves in tthe slotted body is increased by a value ranging between 1.2 and 1.5 times.

The connecting body has at least a transition region for the fibre ribbons in which the helical winding diameter of the ribbons varies uniformly between a helix diameter equal to the diameter of the groove helix in the slotted cable core and the helix diameter of the grooves at the entrance of the flexible body and said transition region has a length which is not less than 1/7 of the helix pitch of the cable core grooves.

The length of the transition region is preferably in the range of 1/5 to ½ the value of the helix pitch of the cable core grooves.

The connecting body has increasingly deeper grooves towards the cable to which the body is fastened, said grooves being part of the transition region.

BRIEF DESCRIPTION OF THE DRAWINGS

Greater details will become apparent from the following description of the invention, with reference to the accompanying drawings, in which:

FIG. 4 is a second portion of the drawing head contiguous to the portion shown in FIG. 3, also in longitudinal section;

FIG. 5 is a cross-sectional view taken along line V—V in FIG. 4;

FIG. 6 is a fragmentary view showing a detail of the structure shown in FIG. 4;

FIG. 7 is a longitudinal sectional view of a third portion of the drawing head that follows the portion shown in FIG. 4;

DESCRIPTION OF THE PRESENTLY PREFERRED EMBODIMENT

Figure 1:
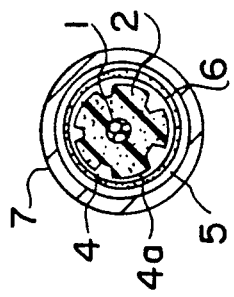
FIG. 1 is a ribbon type optical cable seen in cross section.
Figure 2:
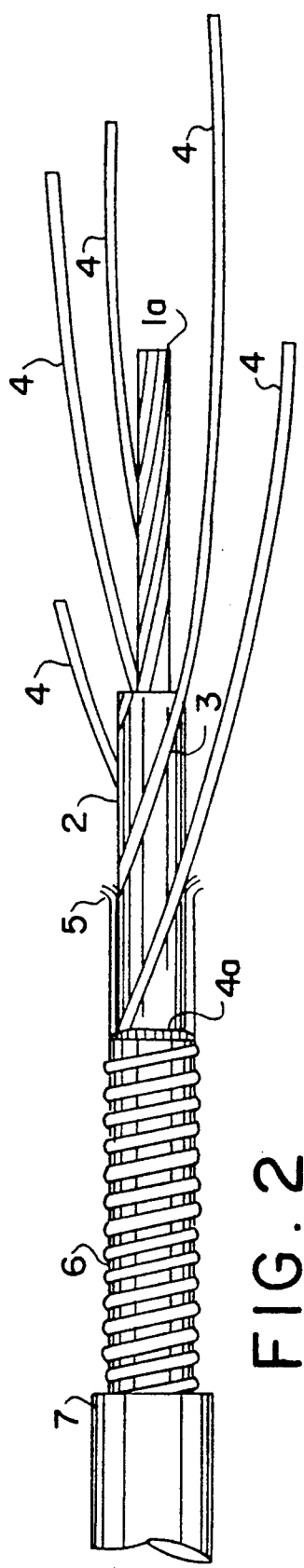
FIG. 2 shows the end portion of a ribbon type optical cable arranged for connection to a drawing head in accordance with the invention.

As shown in FIGS. 1 and 2, a slotted core cable for optical fibre ribbons includes an axial strenght member 1, consisting of a core mode of metal, fibre glass or the like, surrounded by a core 2 made of plastic and provided with grooves 3 of helical development adapted to accommodate several superimposed optical fibre ribbons 4 (for example five ribbons each consisting of four optical fibres).

Externally to the core 2 there are additional outer cable elements including one or more layers 4a wrapping the core, then a layer 5 made for example of aramid fibre or the like, which is pulling-resistant and over which a corrugated sealing (moisture tight) sheath 6 is disposed, made for example of plastic or metal material, which in turn is externally surrounded by a protecting coating or layer 7.

As shown in FIG. 2, a cable of the above type is arranged for connection to a drawing head and subsequently to destination equipment by removing its successive layers in a stepped fashion, so that they may be accessible to the operations necessary for application to the drawing head, which will be described in detail in the following.

The drawing head of the invention, contiguous portions of which are shown in FIGS. 3, 4, 7 and 8, comprises a connecting body 8 having an end portion 9 adapted to be fitted over the end portion 1a of the cord 1, a predetermined length of which has been exposed, and fastened to the same for example by plastic deformation of the portion 9 so that the body 8 is made integral with the cord 1. The body 8, as shown in FIGS. 4 and 6, has several substantially longitudinal or helical grooves 10, the number, section and pitch of which correspond to those of the cable core 2 for which the head is intended and in alignment therewith. The grooves at the free end of the body 8 have a bottom surface disposed on a larger diameter than that of the corresponding grooves in the cable core 2. Housed within said grooves are the fibre ribbons 4 coming from the grooves 3 of the cable core 2.

Conveniently, the grooves 10 in the body 8 are of increasing depth as they approach the portion 9 so that the path followed by the fibre ribbons from the cable core 2 to the body 8 can extend without substantial local increase in bending, that is, in an unstepped manner.

In addition, the body 8 also has a threaded bore 11, coaxial with the portion 9 and within which is engaged a threaded portion 12a of the terminal 12 of a tie rod 13 comprising a metal cable 14 or similar pulling-resistant material to which the terminal 12 is fastened, for example by mechanical deformation.

The terminal 12 is conveniently locked to the body 8 through a pair of counter-tightened nuts 15, 15.

Externally to the tie 13, there is a hollow body 16 made of flexible material, preferably plastic material such as polytetrafluorethylene (PTFE), having several substantially longitudinal or helical grooves 17, the number, section and pitch of which correspond to those of the body 8 and are adapted to receive the optical fibre ribbons 4 housed in said body 8. For the purpose of keeping the alignment between the grooves of body 8 and those of body 16, the latter is provided with an axially projecting dog 18 designed to be received in a corresponding cavity 19 of body 8, as shown in FIG. 6.

As is apparent from the figures, grooves 10 and 17 preferably have a helical development on the surfaces of body 8 and body 16, respectively, with a pitch which corresponds to that of grooves 3 in the cable core 2, or at least a pitch which does not impose significant bending upon the fibre ribbons accommodated within the grooves and in the transition region from core 2 to body 8.

The slotted body 16 and tie rod 13 inside thereof have a length such as to hous in the slotted body grooves a portion of fibre ribbons sufficient for the cable connecting operations or the like. For example the body 16 can be of a length ranging between 50 cm and one meter so that a corresponding length of fibre ribbons can be available for the necessary connections, once the drawing head has been removed.

Close to the opposite end of the tie rod 13, at the end of body 16, there is a sleeve 21, secured to the metal cable 14, for example, by plastic deformation of one portion 22 thereof. The sleeve 21 has a thread 23 on which nuts 24, 25 are counter-tightened, the later axially locking a cup 26 against which one end of a spring 27 abuts, while the outer end of the spring acts on the body 16 through a washer 26'.

At the end of the metal cable 14, there is a threaded terminal 28 secured to the metal cable 14 and to which a grasping element for the pulling action is connected, such as, for example, an eyebolt 29 or the like.

At the outside of the cable core 2 (FIG. 3), there is a sleeve 30, along the surface of which the fibres of the cable layer 5 are laid, the fibres then being locked between the sleeve 30 and the end portion 31 of outer sleeve 32, the fibres 5 and the sheath 6 being secured to the sleeves 30 and 32 by plastic deformation or by the use of adhesive materials or similar techniques, or optionally a combination of these.

The opposite portion 33 of the outer sleeve 32 is in turn fitted on the cable portecting coating 7, a sealant 7a being optionally interposed therebetween, whereas the middle portion of the sleeve 32 has an external thread for engagement with a tubular body 34 tightened thereon until its head 35 is brought into abutment against the body 8.

The above structure enables the cable sheath 6, layer 5 and cord 1 to be pulled as a unit so that the pulling loads applied to the cable are distributed among them depending upon the design features of the cable itself, thereby avoiding the occurrence of relative movement between the parts subjected to a pulling action which could induce stresses in the fibre ribbons 4.

Figure 3:
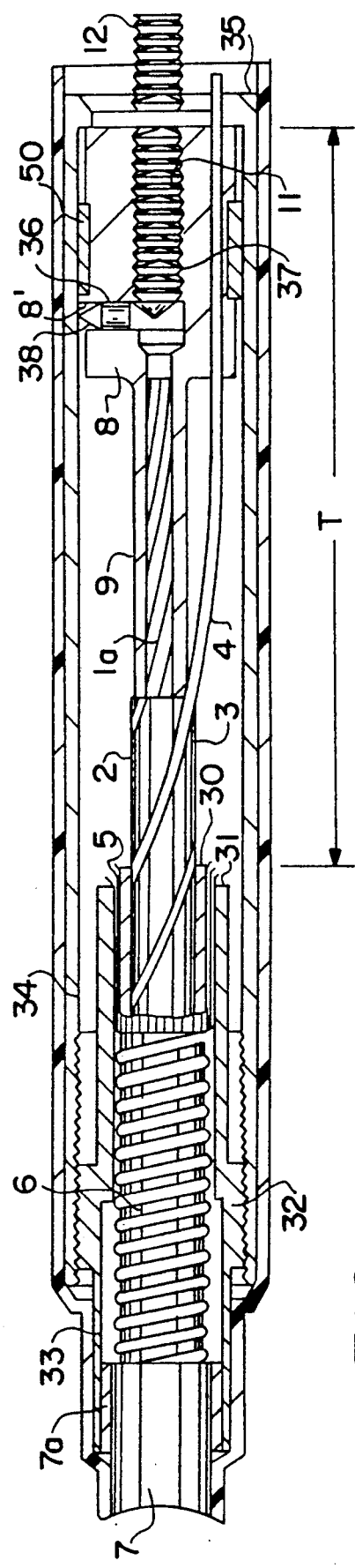
FIG. 3 is one portion of a drawing head in accordance with the invention, seen in longitudinal sectional view.

As shown in FIG. 3, the body 8 is provided with a radial bore 8' in which a pin 36 is slidably movable, the inwardly directed end of which is chamfered and in engagement with a tapered end set screw 37 screwed down in the threaded bore 11.

The tightening of the screw 37 produces a radially outward sliding of the pin 36 so that its end tip 38 is brought into engagement with the tubular body 34, preventing it from rotating relative to the body 8 and in this way assuring that the tubular body 34 will not unscrew, which would alter the distribution of pulling loads between the different resistant components of the cable.

In addition, the pin 36, by preventing the body 8 and tubular body 34 from rotating with respect to each other, enables the tightening of terminal 12 into the threaded bore of the body 8, the rotation of body 8 being directly locked by the engagment of the pin 36 with the body 34, without deformable elements being interposed, which could rise to slight rotations between the body 8 and the cable, thereby stressing the fibres.

Figure 8:
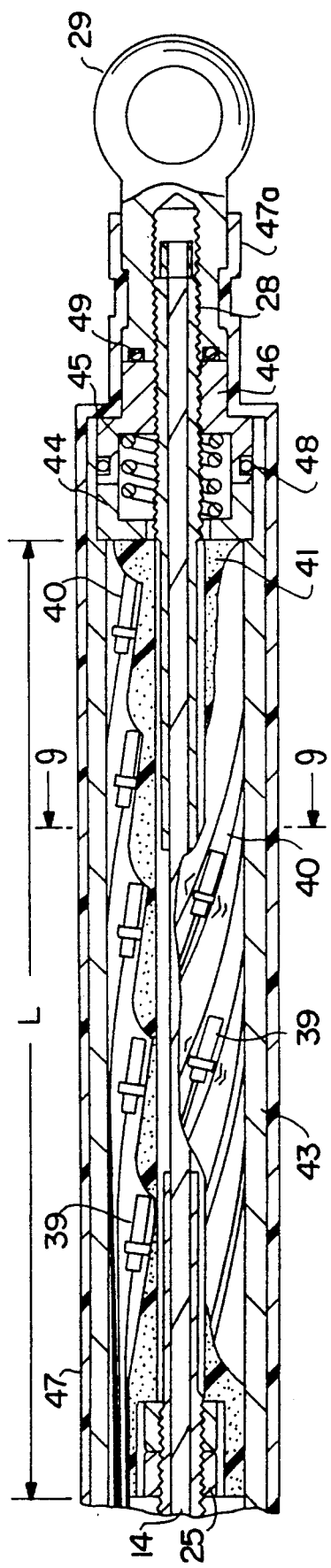
FIG. 8 is a longitudinal sectional view of an end portion of the drawing head that follows the portion shown in FIG. 7.

Each group of fibre ribbons 4 coming out of one of the grooves in the cable core 2 is housed in a corresponding groove 10 in body 8 and then in a groove 17 of body 16, while substantially keeping the same bending value as within the cable. At the end of the body 16, the fibre ribbons are cut at different gradually-increasing lengths starting from the lower ribbon, and a respective connector 39 is applied to each ribbon, as shown in FIGS. 7 and 8.

Between the sleeve 21 and terminal 28 provision is made for a space of sufficient length L for accommodating all connectors of each ribbon group in a succession, without relative intereference and preferably, with some space between them, which can allow a tolerance in the cut lengths and in applying the connectors to the ribbons.

The ribbons and respective conenctors are conveniently accommodated within respective grooves 40 in a tubular support body 41 made of readily deformable material, e.g. formed plastic, where the connectors are received and form individual recesses by elastic deformation of the material, being therein protected against impact, shaking and the like.

In abutment against the end 35 of the tubular body 34 is the first one of a series of tubular segments or tube portions 42 which are articulated with respect to one another and surround the body 16 thereby offering protection against mechanical stresses to the fibre ribbons housed within the body. The last one of the segments is located in the vicinity of the sleeve 21, and a tubular sheath 43 rests thereagainst, the sheath 43 covering the deformable support body 41 and protecting the fibre ribbons and connectors arranged therein.

Figure 10:
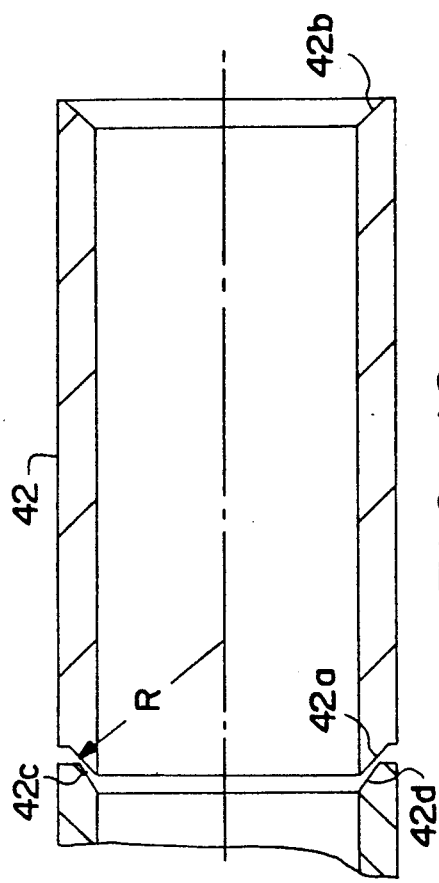
FIG. 10 is a longitudinal sectional view that shows the protecting tubular segments separately and to an enlarged scale.
Figure 9:
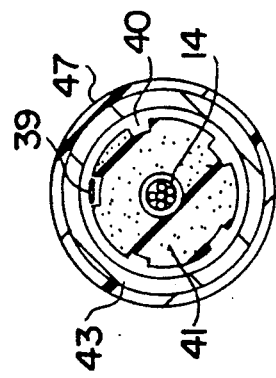
FIG. 9 is a cross-sectional view taken along line IX—IX in FIG. 8.

As shown in FIG. 10, each tubular segment 42 has one end with a spherical-surface portion 42a of radius R, whereas the opposite end has a corresponding conical surface 42b, designed to be brought into contact with the surface 42a of the contiguous tubular segment. Surfaces 42a and 42b are then followed by radial annular portions 42c and 42d, respectively.

The same spherical-surface end configuration is provided on the end of the sheath 43, whereas the end 35 of the tubular body 34 has a conical surface.

In this way articulation between successive segments 42 is ensured, as well as between the latter and the tubular body 34 and the sheath 43. While the contact between these elements is maintained, the angular displacement between successive segments is restricted by virtue of the contact between the abutment surfaces 42c and 42d, and consequently the overall beinding radius to which the body 16 can be subjected is limited.

The tubular sheath 43, at the opposite end from the one in contact with segments 42, has an abutment surface against which a cup 44 bears. The cup 44 is pushed by a spring 45 preloaded by a ring nut 46 screwede on the threads of the terminal 28, which ring nut sandwiches the cup 44, sheath 43 and the tubular segments 42 between it and tubular body 34.

The eyebolt 29, also screwed on the terminal 28, is urged into abutment against the ring nut 46, counteracting the untightening thereof.

The springs 45 and 27, mounted under predetermined preload conditions, ensure that the parts of the drawing head in abutment against each other remain in contact even in the presence of elastic elongation of the tie rod 13 due to a tractive effort, during the laying of the cable, for example.

The hydraulic sealing of the drawing head in accordance with the invention can be ensured by an outer sealing sheath 47, made of elastomeric material, fitted over the calbe sheath 7 and elements 34, 42, and 43. The sheath 47 can be formed of elastic or heat-shrinkable material or a tape covering or the like.

At the free end of the drawing head, that is adjacent the eyebolt 29, as shown at 47a in FIG. 8, the sealing sheath 47 extends until it covers a part of the eyebolt 29.

In addition to the above, towards the end of the drawing head, hydraulic sealing is ensured by an annular packing 48, located intermediate the ring nut 46 and tubular sheath 43 and a packing 49 located intermediate the eyebolt 29 and ring nut 46.

In accordance with an alternative embodiment, in place of the sheath 47, seals or similar means can be disposed between eac of the outer parts of the drawing head, and kept pressed against each other by the spring 45. Between the sleeve 32 and the cable coating 7 sealing can be ensured by a sealant 7a and further sealant can be diposed at the threaded coupling between the sleeve 32 and tubular body 34.

For application of the drawing head to the cable, in accordance with the invention, the cable end is first prepared stepwise devoid of its layers, so that a cord portion 1a sufficient to fasten the body 8 thereto is made accessible, and a core 2 portion corresponding to or greater than the sleeve 30 length is uncovered. The optical fibre ribbons 4 are maintained to the overall length required for the following operations.

On the prepared cable, there is applied the sleeve 30 and outer sleeve 32, locking the fibre layer 5 therebetween and locking the sleeve 32 on the corrugated cable sheath 6. Subsequently, the body 8 is fastened to the core 1, preferably with the aid of a locating apparatus or similar means, enabling correct alignment to be ensured between the cable grooves 3 and the grooves 10 of body 8.

The optical fibre ribbons 4 are then led within the grooves 10 and held therein, for example, by a binding tape 5/ or the like (FIG. 3). The tubular body 34 is, then, screwed down on the sleeve 32 until it comes into abutment against the body 8 and is, thereupon, locked in position by the pin 31 and grub screw 37.

The tie rod 13 and slotted body 16, previously assembled one within the other and axially slidable with respect to each other, are then mounted, securing the tie rod 13 within the body 8 and a sligning the grooves of body 16 and body 8. The fibre ribbons 4 are then located within the respective grooves 17 and optionally held therein by taping or the like, not shown.

The body 11 is then axially secured over the tie rod 13 through the cup 26, spring 27 and washer 26'.

The fibre ribbons are finally stepwise cut to measure, starting from the innermost one present in each groove, and a respective connector is applied thereto. Since longitudinally fixed recesses are not present in the grooves 40 for the connectors, but on the contrary the connectors create suitable recesses in a self-executed manner within said grooves by elastically deforming the material, a certain number of faults are permissible in applying the connectors.

In fact, on detecting an imperfect connection of a ribbon to its respective connector it is necessary to cut the ribbon at a position contiguous to the applied connector and apply a new connector. For this purpose the length L of the support body 41 is provided to be in excess, relative to the minimum length required for housing the connectors without relative interference, preferably at least by the length of a connector. This, in case of fault, enables one or more repetition of the application operation of a connector to a ribbon for each group of ribbons housed in a groove. The positions of the ribbon connectors in the various groups are independent of one another.

Preferably, the length L is in excess at least by the length of two connectors, so that in case of fault the application of the connectors to the ribbons of each group can be repeated at least twice.

In this manner, the risk of being required to repeat the whole operation involving the application of the drawing head and connectors to the ribbons can be avoided, even in the presence of a defective connector or a connector applied in an incorrect manner, which would be particularly troublesome should the defective connector be for example among the last mounted ones.

In addition, the connector accommodation within recesses formed by elastic deformation of the material of the body 41 offers the advantage of elastically embedding the connectors themselves, thereby protecting them against impact, vibration and the like which can take place during the cable laying step.

When the cable laying step has been completed, the drawing head can be removed in order to effect the connection of the ribbons through the respective connectors. For this purpose the sealing sheath 47 is removed, for example, by tearing it and then the mounting operations are repeated in reverse order, that is the tubular sheath 43, segments 42, body 41, body 16 and tie rod 13 are removed, so that a length of fibre ribbons sufficient to enable the same to reach the respective connection or accommodation points, is made available.

The connecting body 8, tubular body 34 and sleeve 32 are, on the contrary, kept fastened to the cable end and can constitute the mechanical fastening members between the cable and the equipment to which the cable must be connected.

As previously described, the stress state of an optical fibre or an optical fibre ribbon is a function of the bending (flexion and twisting) thereof. The drawing head in accordance with the invention provides that this stress state in the drawing head itself may be matained substantially unchanged.

For a helix-wound filiform element, such as an optical fibre or an optical fibre ribbon, change in the diameter on which the helix is wound, the pitch being equal, results in a variation in the bending state; and, in particular, the increase in diameter from the cable core 2 to the tubular body 16 involves an increase in bending while keeping the helix pitch constant.

In a preferred embodiment, for the purpose of keeping the bending state of the fibre ribbons as constant as possible, in the structure in accordance with the invention, the pitch of the slotted body 16 is different from that of the core 2 and, in particular, with a diameter of the cavity bottom in body 16 in the range of 2 to 5 times the diameter of the cavity bottom in core 2, the pitch in the body 16 is provided to be of a value in the range of 1.2 to 1.5 times the pitch in the core 2. The body 8 corresponds to a transition region in which the fibres are gradually brought from a helix diameter corresponding to the cable core 2 to a helix diameter corresponding to the slotted body 16 and at the same time the helix pitch changes from the groove pitch in the cable to the groove pitch in the slotted body 16.

The transition region in its most general formulation can be substantially extended from the end of the sleeve 30 to the end of the connecting body 8 and corresponds to the portion in which the fibre ribbons devoid of outer constraints can be brought to be helically wound on a greater diameter. The transition region, on the other hand, can be of more reduced length should further constrains for the orientation of the fibre ribbons be present.

For the transition region as above defined, a length T (FIG. 3) not less than 1/7 of the helix pitch in the cable is conveniently provided and preferably, a length ranging between 1/5 to ½ of the value of said pitch, in connection with diameter values of the cable core and the slotted body in the drawing head as above described.

By way of example, with a cable having a slotted core 2 of a diameter to the cavity bottom of 5 mm and a helix pitch of 350 mm, the slotted body 16 can have a diameter of 20 mm to the end of the respective grooves accommodating the fibre ribbons, and under these conditions a convenient helix pitch in the body 16 which prevents change with time of the transmissive features of the ribbon fibres 4, is 450 mm. The transition region from core 2 to body 8 conveniently has a length T=100 mm.

In accordance with an alternative embodiment, the helix pitch variation from the pitch in the cable core 2 to the pitch intended for the slotted body 16 can be accomplished at least partly in the body 16 itself, by providing a variable pitch for the latter, going from a starting value equal to or slightly higher than the core 2 value until the final maximum value as stated above, optionally in association with a diameter increase of the body 16 itself.

The structure in accordance with the invention, therefore, enables the stress state in the fibre ribbons to be held as low as possible, substantially to a value not higher than that present in the cable and in addition enables complete protection of the fibre ribbbons already provided with connectors and of the connectors themselves both during the storage and during cable laying, avoiding outer loads being transmitted to the fibre ribbons, for example, in case of cable dragging and also preventing water infiltration towards the ribbons.

Such a structure at the same time has a diameter which is comparable to the cable diameter, so that it can be led into ducts designed to accommodate the cable with a reduced clearance without thereby involving excessive bending to the fibre ribbons, the excess length of which, necessary to lead them to the respective connection points, being disposed in a substantially longitudinal direction in the drawing head. The extension in length of the drawing head, on the other hand, does not damage the assembly flexibility necessary for the laying operations, by virtue of the relative articulated feature of the tubular segments 42.

Many variations can be made without departing from the true spirit of the invention as defined in the appended claims.

The embodiments of the invention in which an exclusive property or privilege is claimed are defined as follows:

1. A drawing head for ribbon type optical cables in which optical fibre ribbons are received in respective helical core grooves provided in a slotted core surrounding an axial strength member and surrounding which are additional outer cable elements, a portion of the axial strenght member extending axially outwardly from said slotted core by a first predetermined distance, the optical fibre ribbons extending axially outwardly from said slotted core by a second predetermined distance greater than said first predetermined distance and the optical fibre ribbons having connectors at their respective ends for connecting the optical fibre ends to other equipment, said drawing head comprising:
   a drawing member having at one end thereof attaching means for securing said drawing member to said portion of the axial strength member and to at least one of the additional outer cable elements;
   a pulling member connected to the other end of said drawing member for pulling said drawing member and the axial stength member and said at leasat one of said additional outer cable elements secured thereto; and
   optical fibre ribbon guiding and supporting means intermediate said attaching means and said pulling member, said guiding and supporting means and said attaching means having an axial length at least equal to said second predetermined distance and said guiding and supporting means having grooves therein alignable with the grooves in the slotted core for receiving the optical fibre ribbons and including a supporting body intermediate said attaching means and said pulling member which is deformable by the connectors engaged thereby to provide axial recesses therein receiving the connectors.

2. A drawing head according to claim 1 wherein there are a plurality of optical fibre ribbons in each of the helical grooves of the slotted core and said grooves in said guiding and supporting means are each dimensioned to receive said plurality of optical fibre ribbons.

3. A drawing head according to claim 1 further comprising axial preloading means cuting between said drawing member and said guiding and supporting means for compensating for the elongation of said drawing member when said drawing member is subjected to pulling force.

4. A drawing head according to claim 1 wherein said attaching means comprises a rigid connecting body for receiving and engaging the portion of the axial strength member coaxially with said body, and said drawing member comprises a tie rod connected coaxially to said connecting body, said connecting body having helical grooves on the outer surface thereof corresponding in number, section and direction to the grooves of the slotted core receiving the fibre ribbons, whereby said ribbons can be led from the grooves in the slotted core to said grooves in said connecting body without significant change in the degree of bending.

5. A drawing head according to claim 4 wherein said guiding and supporting means includes a flexible body with helical grooves for receiving optical fibre ribbons disposed intermediate said connecting body and said supporting body.

6. A drawing head according to claim 5 wherein said flexible body and said connecting body include keying means for preventing relative rotation therebetween and for maintaining said flexible body grooves in registration with said grooves in said connecting body.

7. A drawing head according to claim 5, further comprising elastic, axial preloading means acting between said drawing member and said flexible body for maintaining said flexible body against said connecting body, thereby compensating for extension of said drawing member when subjected to pulling force.

8. A drawing head according to claim 4 wherein said attaching means includes mechanical engaging means for securing said drawing member to said at least one of the additional outer cable elements, said mechanical engaging means comprising a tubular body axially abutting said connecting body and a sleeve engaging said tubular body and securable to said at least one of the additional outer cable elements.

9. A drawing head according to claim 8 wherein said tubular body is secured to said sleeve by means of a threaded connection.

10. A drawing head according to claim 9, further comprising relative rotation resistant means for resisting loosening of said threaded connection.

11. A drawing head according to claim 10 wherein said relative rotation resistant means is interposed between said tubular body and said connecting body.

12. A drawing head according to claim 5, further comprising tubular protecting means encircling said flexible body for protecting the ptical fibre ribbons received in the flexible body grooves, said protecting means comprising tubular segments articulated with respect to each other.

13. A drawing head according to claim 12 wherein said tubular segments are articularted with respect to each other through ball-and-socket joints provided with abutment surfaces limiting the articulation angle.

14. A drawing head according to claim 12, further comprising elastic axial preloading means acting between said drawing member and said tubular segments for axially maintaining said tubular segments in end-to-end abutment.

15. A drawing head according to claim 5 wherein said supporting body comprises a tubular element provided with longitudinal grooves the number, shape and position of which correspond to said grooves in said flexible body.

16. A drawing head according to claim 1 wherein said supporting body has an axial length exceeding the axial length from the connector nearest said slotted core to the connector farthest from said slotted core which is to be engaged by said supporting body.

17. A drawing head according to claim 1, further comprising sealing means for sealing said pulling member with respect to the remainder of said drawing member and for sealing said drawing member with respect to the additional outer cable elements for preventing water from penetrating at optical cable to which the drawing head is attached.

18. A drawing head according to calim 17 wherein said sealing means comprises a tubular sheath for covering an end portion of the optical cable and the drawing member at least up to said pulling member, said tubular sheath comprising a sleeve of an elastic material which is tightly applied to the end of the optical cable and to said drawing member.

19. A draring head according to claim 14, further comprising fluid sealing packing interposed between said pulling member and one of said tubular segments, and wherein said elastic axial preloading means for axially maintaining said tubular segments in end-to-end abutment also acts betwee said pulling member and said tubular segments for applying a sealing force to said packing.

20. A drawing head according to claim 5 wherein said supporting body is provided with grooves for receiving said fibre ribbons, and both said grooves in said flexible body and said grooves in said supporting body having a helical development at a greater diameter than the diameter of the slotted core.

21. A drawing head according to claim 20 wherein said groove in said flexible body have the same pitch as the grooves of the slotted core.

22. A drawing head according to claim 20 wherein said grooves in said flexible body have a greater pitch than the groooves of the slotted core.

23. A drawing head according to claim 22 wherein said flexible body has a diameter ranging between 2 and 5 times the diameter of the slotted core to which the drawing head is to be attached, and the pitch of the grooves in said flexible body is in the range from 1.2 to 1.5 times the pitch of the slotted core grooves.

24. A drawing head according to claim 5 wherein said connecting body has at least a transition region for the fibre ribbons in which the helical winding diameter for the ribbons varies uniformly between the diameter of the helical groove in the slotted core and the diameter of the helical grooves at the entrance to the flexible body, and said transition region has a length which is not less than 1/7 of the pitch of the slotted core helical grooves.

25. A drawing head according to claim 24 wherein the length of the transition region is in the range of 1/5 to ¼ the pitch of the slotted core helical grooves.

26. A drawing head according to claim 24 wherein said grooves in said connecting body increase in depth in the direction from said flexible body toward said attaching means.

* * * * *

UNITED STATES PATENT AND TRADEMARK OFFICE
CERTIFICATE OF CORRECTION

PATENT NO. : 5,129,027

DATED : July 7, 1992

INVENTOR(S) : Boero et al

It is certified that error appears in the above-identified patent and that said Letters Patent is hereby corrected as shown below:

Col. 1, line 68, after "fibre" --ribbons-- should be inserted;
Col. 2, line 14, "exampe" should read --example--;
Col. 2, line 67, "positins" should read --positions--;
Col. 3, line 31, "compreses" should read --comprises--;
Col. 3, line 37, "resitant" should read --resistant--;
Col. 3, line 53, "tthe" should read --the--;
Col. 4, line 36, "strenght" should read --strength--;
Col. 4, line 37, "core" should read --cord--;
Col. 5, line 22, "polytetrafluorethylene" should read --polytetrafluoroethylene--;
Col. 5, line 40, "hous" should read --house--;
Col. 5, line 53, "outer" should read --other--;
Col. 7, line 20, "screwede" should read --screwed--;
Col. 7, line 49, "eac" should read --each--;
Col. 8, line 5, "5/" should read --50--;
Col. 8, line 12, "a sligning" should read --aligning--;
Col. 8, line 16, "11" should read --16--;

UNITED STATES PATENT AND TRADEMARK OFFICE
CERTIFICATE OF CORRECTION

PATENT NO. : 5,129,027
DATED : July 7, 1992
INVENTOR(S) : Boero et al

It is certified that error appears in the above-identified patent and that said Letters Patent is hereby corrected as shown below:

```
Col. 9, line 39,  "constrains" should read --constraints--;
Col. 11, line 51, "ptical" should read --optical--;
Col. 11, line 56, "articularted" should read --articulated--;
Col. 12, line 14, "at" should read --an--; and
Col. 12, line 28, "betwee" should read --between--.
```

Signed and Sealed this

Twenty-eighth Day of December, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,129,027

DATED : July 7, 1992

INVENTOR(S) : Boero et al

It is certified that error appears in the above-identified patent and that said Letters Patent is hereby corrected as shown below:

```
Col. 10, line 31, change "strenght" to --strength--;
Col. 10, line 45, change "leasat" to --least--;
Col. 10, line 67, change "cuting" to --acting--;
Col. 11, line 51, change "ptical" to --optical--;
Col. 11, line 56, change "articularted" to --articulated--;
Col. 12, line 16, change "calim" to --claim--;
Col. 12, line 23, change "draring" to --drawing--.
```

Signed and Sealed this

Twenty-fifth Day of January, 1994

Attest:

BRUCE LEHMAN

*Attesting Officer*  *Commissioner of Patents and Trademarks*